(12) United States Patent
Chuan

(10) Patent No.: US 11,782,834 B2
(45) Date of Patent: Oct. 10, 2023

(54) SYSTEM AND METHOD FOR ROUND ROBIN ARBITERS IN A NETWORK-ON-CHIP (NOC)

(71) Applicant: ARTERIS, INC., Campbell, CA (US)

(72) Inventor: Boon Chuan, Scotts Valley, CA (US)

(73) Assignee: ARTERIS, INC.

( * ) Notice: Subject to any disclaimer, the term of this patent is extended or adjusted under 35 U.S.C. 154(b) by 0 days.

(21) Appl. No.: 17/692,170

(22) Filed: Mar. 11, 2022

(65) Prior Publication Data

US 2023/0289289 A1    Sep. 14, 2023

(51) Int. Cl.
*G06F 12/08* (2016.01)
*G06F 9/48* (2006.01)
*G06F 13/37* (2006.01)
*G06F 12/0817* (2016.01)

(52) U.S. Cl.
CPC ........ *G06F 12/0828* (2013.01); *G06F 9/4881* (2013.01); *G06F 13/37* (2013.01); *G06F 2212/621* (2013.01)

(58) Field of Classification Search
CPC ........... G06F 12/0828; G06F 2212/621; G06F 9/4881; G06F 13/37
See application file for complete search history.

(56) References Cited

U.S. PATENT DOCUMENTS

2015/0302126 A1* 10/2015 Hamid ............... G06F 11/25
716/136
2019/0243547 A1* 8/2019 Duggal ............... G06F 3/0619

FOREIGN PATENT DOCUMENTS

CN         112241290 A  *  1/2021  ....... G06F 15/17318

* cited by examiner

*Primary Examiner* — Masud K Khan
(74) *Attorney, Agent, or Firm* — DANA LEGAL SERVICES; Jubin Dana

(57) ABSTRACT

In a network-on-chip (NoC) interconnect connected to one or more agents with multiple input ports, one or more switches are provided with a round robin arbiter constructed to use representations of the input ports and, in some embodiments, the current round robin state, as thermometer codes. By using thermometer code to represent port information, the correspondence to the current input and the current state to be granted can be rapidly determined through a simple two-step AND and XOR operations. With such a simple logical procedure, the number of steps to make the determination, and therefore the energy required, can be reduced by log 2(n) steps or up to 43%. Using thermometer code reduces the number of computations required. Hence, the number of logic circuit elements required to carry out the calculation is reduced, shrinking the floorplan area needed for the arbiter.

9 Claims, 8 Drawing Sheets

| Port No. | Thermometer Code | Graphic Representation |
|---|---|---|
| Port 8 | [ 1 1 1 1 1 1 1 1 ] |  |
| Port 7 | [ 1 1 1 1 1 1 1 0 ] |  |
| Port 6 | [ 1 1 1 1 1 1 0 0 ] |  |
| Port 5 | [ 1 1 1 1 1 0 0 0 ] |  |
| Port 4 | [ 1 1 1 1 0 0 0 0 ] |  |
| Port 3 | [ 1 1 1 0 0 0 0 0 ] |  |
| Port 2 | [ 1 1 0 0 0 0 0 0 ] |  |
| Port 1 | [ 1 0 0 0 0 0 0 0 ] |  |
| Port 0 | [ 0 0 0 0 0 0 0 0 ] |  |

SYSTEM AND METHOD FOR ROUND ROBIN ARBITERS IN A NETWORK-ON-CHIP (NOC)

FIELD OF TECHNOLOGY

The present technology is in the field of computer design tools and, more precisely, related to arbiters used in cache coherent interconnects.

BACKGROUND

In a cache coherent interconnect, such as those with a distributed implementation, a set of connected agents such as CPUs, GPUs, etc. are with a set of Network Interface Units (NIUs) (also sometimes called protocol converter components) that are in turn connected to each other through a network-on-chip (NoC) transport. Communication requests are frequently generated by the various connected agents, and need to be directed through various switches to the appropriate destination.

However, in complex systems with numerous agents, multiple requests for the same output destination may come into the various ports of a switch within a given clock cycle, and the switch must select only one at a time to be transmitted to the destination output port. The element within the switch making this decision is called an arbiter.

Several methods may be used by the arbiter to select messages that may proceed to the output port. A common method is to assign priorities to the various input sources, so that the message selected is that from the highest priority source. This runs the risk, however, that messages from low priority sources never get transmitted, a phenomenon called message starvation. Another simple method is the "First-in First-out" (FIFO) approach, meaning that the first message to arrive is the one that is selected. However, this, too, can lead to inequity, as there is no guarantee that a message from a given source may be first-in and therefore allowed to proceed.

SUMMARY

To address these problems, an arbiter with a "round robin" approach can be implemented. In a round robin approach, the priority between the ports is rotated in a predetermined sequence with each clock cycle. If one port is allowed to communicate its message, that port is moved to the lowest priority in favor of the next port in the sequence for the next clock cycle, and so on. So, for example, if a switch has 4 ports, the priority may rotate from port 0 to port 1 to port 2 to port 3, and then back to port 0 with each successive clock cycle. This ensures that each port has a chance to transmit a message at some point.

Such switches may be inserted into many places within the interconnect and the agents connected to them. A large number of switches with arbiters may lead to a large area dedicated to switches instead of other useful circuit elements. There is therefore a need for a fast and compact architecture for round robin arbiters that reduces the floor space and minimizes energy consumption for the switch, and that can also scale to a large number placements and a large number of input ports to handle requests from multiple input sources. In accordance with embodiments of the invention, a switch for an interconnect connected to one or more agents (intellectual property blocks) with multiple input ports is provided with a round robin arbiter constructed to use thermometer codes.

A thermometer code represents a state by a sequence of 1's in a binary bit sequence. The range of all zeros (e.g. [000000]) to all ones (e.g. [111111]) is represented by bit sequences such as [111000]—all ones up to a point where they are then all zeros.

The current state to be transmitted can, in some embodiments, be stored in a register as a "park point", and that value of that state can be rotated through a predetermined sequence corresponding to various input ports with each clock cycle. By using thermometer code to represent the input port information, and in some embodiments, also using thermometer code to represent the current state value to be granted transmission to the output port, the correspondence to the current input and the current allowed state can be rapidly determined through a simple AND and XOR operations. Using a logical procedure, the number of steps to make the determination, and therefore the energy required, can be reduced by log 2(N) steps, or up to 43%.

In accordance with some aspects and embodiments of the invention, using thermometer code reduces the number of computations required and, thus, the number of logic circuit elements required to carry out the calculation can also be reduced resulting in shrinking the floorplan area needed for the arbiter. When many arbiters are needed, this can result in a significant area reduction, and more room for placement of other circuit elements.

In accordance with some aspects and embodiments of the invention, the arbiter is implemented in a two-step process. In the initial step, the input bit vector of the incoming message is converted to thermometer code. In the second step, an exclusive OR (XOR) operation is carried out to identify if the incoming input bit vector corresponds to the next port allowed in the priority chain. In some embodiments, the process can be executed with a single XOR operation, saving both time and energy.

BRIEF DESCRIPTION OF THE DRAWINGS

In order to understand the invention more fully, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
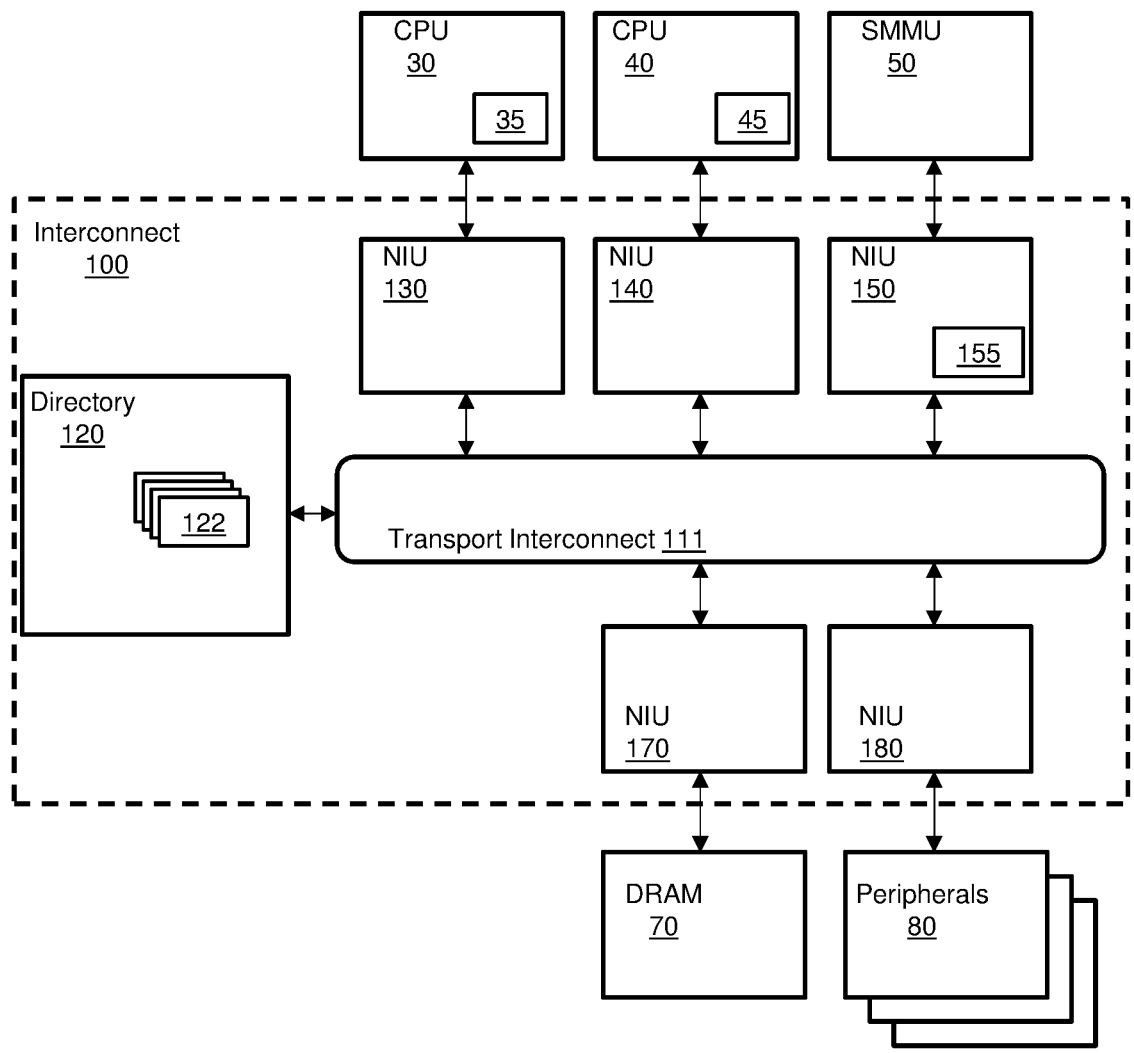
FIG. 1 presents a schematic of a cache coherent interconnect with a distributed implementation in accordance with the various aspects and embodiments of the invention.

Before describing in detail the embodiments that are in accordance with invention, it should be observed that the embodiments reside primarily in combinations of method step and apparatus components related to facilitating the invention. Accordingly, the components and method steps have been represented where appropriate by conventional symbols in the drawing showing only those specific details that are pertinent to understanding the embodiments of the present invention so as not to obscure the disclosure with details that will be readily apparent to those of ordinary skill in the art having the benefit of the description herein.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

The terms "source," "master," and "initiator" refer to hardware intellectual property (IP) modules/blocks or units; these terms are used interchangeably within the scope and embodiments of the invention. As used herein, the terms "sink," "slave," and "target" refer to hardware IP modules or units and the terms are used interchangeably within the scope and embodiments of the invention. As used herein, a transaction may be a request transaction or a response transaction. Examples of request transactions include write request and read request.

Unless defined otherwise, all technical and scientific terms used herein have the same meaning as commonly understood by one of ordinary skill in the art to which this invention belongs. Any methods and systems, similar or equivalent to those described herein, can also be used in the practice of the invention. Representative illustrative methods and embodiments of systems are also described in accordance with the aspects of the invention.

Various references are made herein to integrated circuits (ICs) and the designs of ICs. One example of an IC is a multiprocessor system that is implemented in systems-on-chip (SoCs) that communicates through networks-on-chip (NoC), which is an interconnect. The SoCs include instances of initiator IPs and target IPs. The IP elements or blocks includes pins that have names and connect to the NoC's pins. The NoC pins also have names. Transactions are sent from an initiator to one or more targets using industry-standard protocols. The initiator, which is connected to the NoC, sends a request transaction to a target or targets, using a protocol. The transaction includes an address that identifies or selects the target or targets. The protocol used by one IP can vary from the protocol used by another IP; both can be different from the protocol used by the NoC or interconnect. The NoC includes network interface units (NIU) that act as protocol converters, which are at the boundary of the NoC and convert (decode) from a protocol (of an external device connected to the pins of the NoC) to the internal protocol of the NoC in accordance with various embodiments and aspects of the invention. The NoC decodes the address at the boundary (where the NIUs are located) and transports the request through the NoC to another NIU located at the boundary of the NoC, which other NIU is in communication with the target (destination). The transaction is converted from the NoC's protocol to the target's protocol at the NIU or the boundary of the NoC. The target receives and handles the transaction. The target then sends a response transaction, which is transported back by the NoC to the initiator. As such, the SoC and NoC include complexity and configurability, especially in situation when the NoC is configurable.

The invention applies to cache coherent interconnects that have a distributed implementation. In such a distributed implementation, several elements, or components, share memory to gain performance. The various elements with memory cache components are connected through a transport, such as a NoC, and cache lines that connect and synchronize them are tracked by the cache coherent interconnect.

An example of a distributed cache coherent interconnect can be seen in FIG. 1. In accordance with one example and aspect of the invention, the interconnect 100 provides communication between several agents and elements within a computer system. The backbone of the system is a transport interconnect 111, providing wiring that links all elements of the system or SoC. The transport interconnect 111 controls and manages the state of cache lines inside the system, so that coherency is maintained.

Agents, such as a first central processing unit (CPU) 30, a second central processing unit (CPU) 40, and a System Memory Management Module (SMMU) 50, are connected through protocol converters, also called network interface units (NIUs) 130, 140, and 150 respectively. The illustrated example also provides connections to elements such as DRAM memory 70 and other peripherals 80 through additional NIUs 170 and 180, respectively.

In addition to the external links provided by NIUs, the interconnect 100 may also contain internal modules. Shown in FIG. 1 is the example of an interconnect comprising a module that serves as a Directory 120 that provides snoop filters 122 that store the addresses of memory in the caches. The Directory 120 is also attached to the transport interconnect 111 for communication with the various NIUs.

Some of the external agents may already be provided with a memory cache, such as CPUs 30 and 40, illustrated with memory caches 35 and 45, respectively. Other external agents, such as the SMMU 50, may not be provided with cache, and the corresponding NIU 150 may be configured to provide a proxy cache 155.

It should be noted that, although this illustration shows a representation of a cache coherent interconnect, it will be clear to those skilled in the art that cache coherent interconnects may have many more components than those shown in the illustration. Furthermore, although only one directory is shown in the illustration, cache coherent interconnects can have many directories distributed throughout the design that share the tasks of memory management. Furthermore, although the illustration shows wires connecting the CPUs to their associated NIUs to provide the enter/exit information (as may be found in the hardwired handshake used by ARM CPUs), other CPUs may use different techniques to communicate, such as control and status register (CSR) that may communicate instructions, used, for example, in RISC-V processors.

Figure 2:
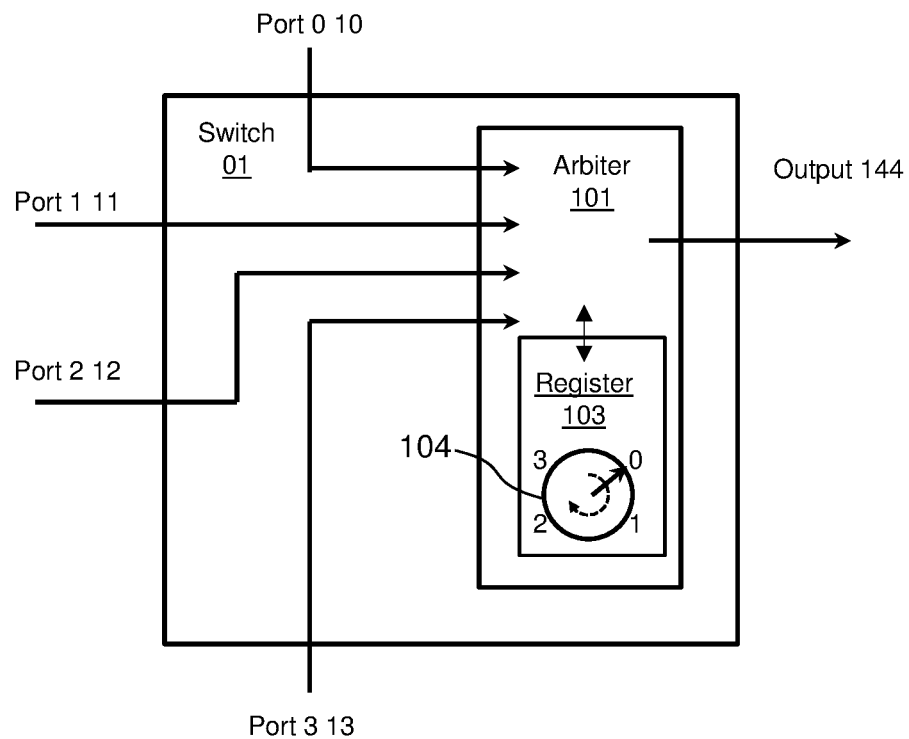
FIG. 2 presents a schematic of a switch having 4 inputs and a round robin arbiter in accordance with the various aspects and embodiments of the invention.

FIG. 2 illustrates a schematic of a switch 01 using a round robin arbiter 101 to connect several input ports. In this example, 4 input ports (port 0 10, port 1 11, port 2 12, and port 3 13) are connected through the arbiter 101 with one possible output port 144, although the number of ports may be far larger in practical switches. To decide if a message from one of the inputs should be transmitted to the corresponding destination, the arbiter 101 calls on a round robin register 103 that stores a state value 104 identifying the current port to be given priority. The state value will typically be stored as a binary representation of the port, e.g. port 0 would be [0000]; port 2 would be stored as [0010], etc.

If, for example, port 0 10 is the current priority port, when two messages arrive within a given clock cycle, the arbiter will compare the incoming port information with the value stored in the register, and will determine if one of the messages corresponds to the current priority port (in this example, currently port 0 10) and the arbiter grants the request of the port to transmit a message from port 0 10 to the output 144. If neither of the requests correspond to the current priority port, the register looks up the next port in its priority list (in this example, port 1), and determines if the one of the messages corresponds this second highest priority port. If so, the arbiter grants the request to transmit the message from port 1 11 to the output 144.

Figure 3:
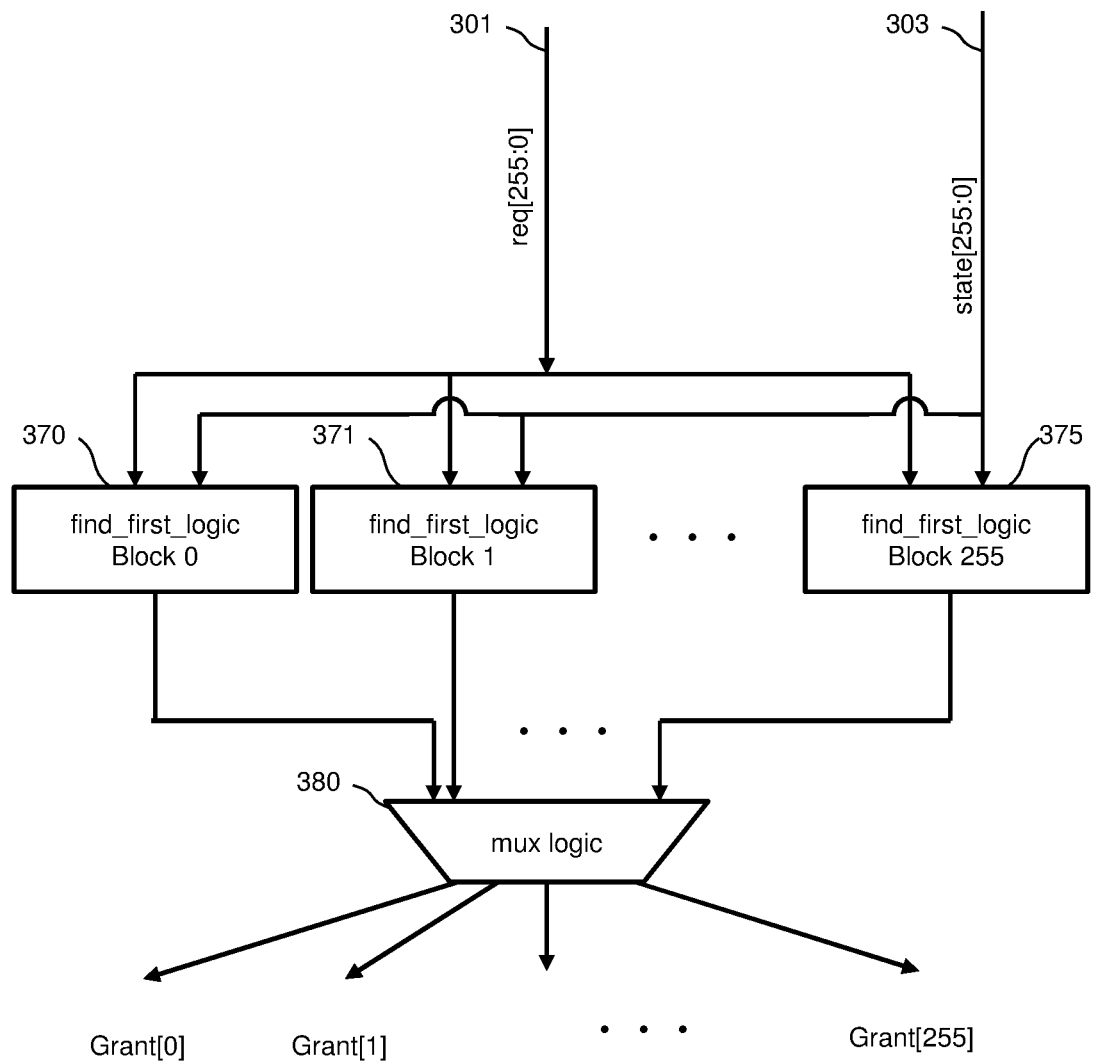
FIG. 3 presents a logical flow chart for the steps used in a conventional round robin arbiter having 256 inputs in accordance with the various aspects and embodiments of the invention.

In a conventional round robin architecture, when the number of ports is large, and the number of requests within a clock cycle can also be large, this can be computationally intensive. For example, for a 256-bit traditional round robin arbiter, the logic steps are illustrated in FIG. 3. A request for transmission of a message "req[255:0]" 301 arrives, and must be compared to the current state value "state[255:0]" 303 of the round robin register by 256 Find_first_logic modules (shown as 370, 371, ..., 377) and then multiplexed in a multiplexor 380.

The number of levels of logic (2 input gate equivalents) for this 256-bit traditional round-robin arbiter is given by:

$$\begin{aligned}\text{Levels of Logic} &= \text{Find\_first\_logic}(1 + 1 + \log2(n)) + \\ &\quad \text{mux logic}(1 + \log2(n)) \\ &= 3 + (2*\log2(n)) \\ &= 3 + (2*\log2(256)) = 3 + (2*8) = 19\end{aligned}$$ [Eqn. 1]

So, for a 256-bit arbiter, the traditional round robin arbiter (aka arb_rr1) would conservatively have 19 levels of logic, and area wise, 256 times the area of a "find-first_1" block.

In accordance with various aspects and embodiments of the invention, instead of representing the round robin state in a register as a numerical value in binary, a code representation in "thermometer code" can be used. This is so named because it can be useful for representing digital information that can fall on a scale, such as in the analog-to-digital conversion of a thermometer reading.

Figure 4:
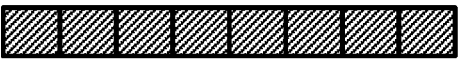
FIG. 4 presents a graphical illustration of port number conversion to thermometer code in accordance with the various aspects and embodiments of the invention.
Figure 4:
Figure 4:
Figure 4:
Figure 4:
Figure 4:
Figure 4:
Figure 4:
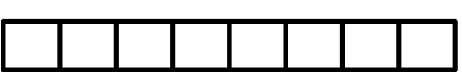
Figure 4:

An illustration of an example a sequence of digits in thermometer code is shown in FIG. 4. Instead of using a numerical value representation in binary for the port number, the placement of the "first_1" in the sequence represents the value to be stored. On the right-hand side, a graphical display of the blocks, with clear representing 0 and dark representing 1, is shown for illustrative purposes.

By converting the stored round robin value into thermometer code, and then also converting the incoming port information into thermometer code, the number of operations required to compare the two can be significantly reduced.

Figure 5:
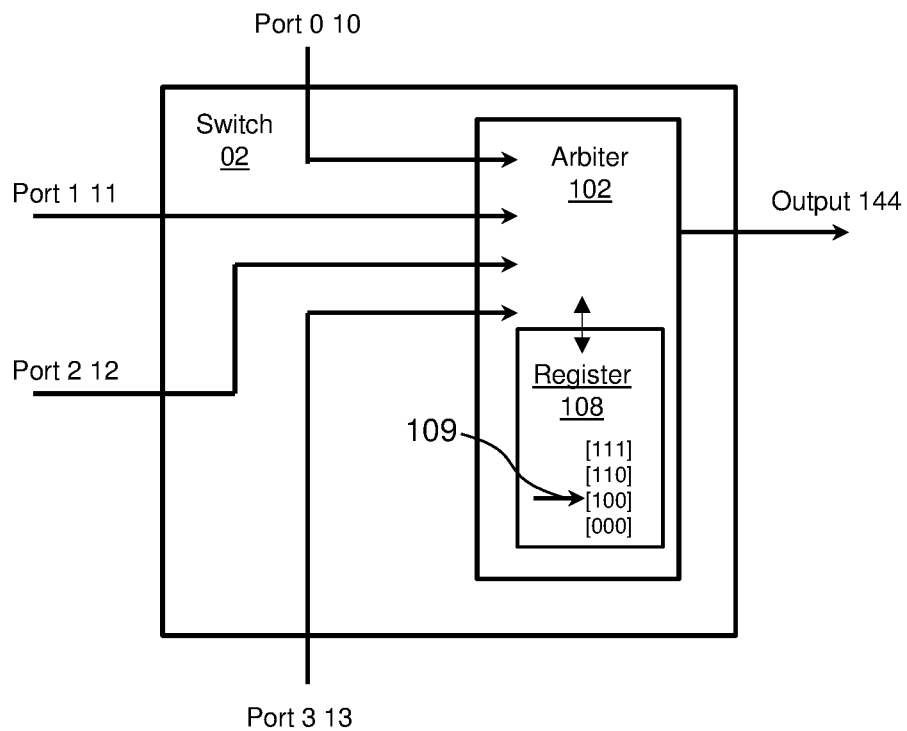
FIG. 5 presents a schematic of a switch having 4 inputs and a round robin arbiter in accordance with the various aspects and embodiments of the invention.

FIG. 5 illustrates a schematic of a switch 02 using a round robin arbiter 102 to connect the 4 input ports of FIG. 2 to output port 144. To decide if a message from one of the inputs should be transmitted to the corresponding destination, the arbiter 102 calls on a round robin register 108 that stores a state value 109 identifying the current port to be given priority in thermometer code.

Figure 6:
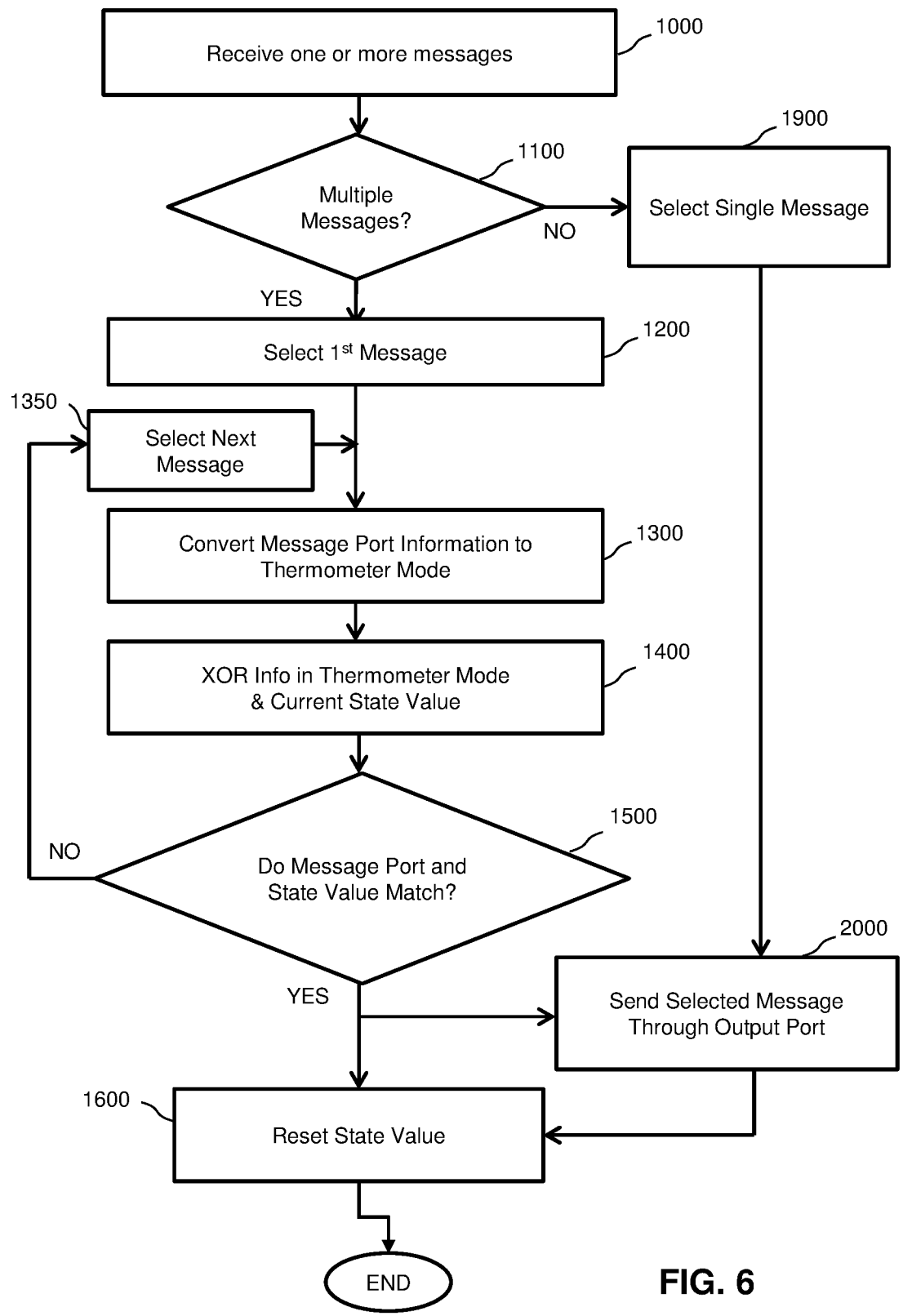
FIG. 6 presents a flow chart of the process used to compare input ports and the grant transmission through the output ports in accordance with the various aspects and embodiments of the invention.

FIG. 6 illustrates a flow chart for a method implementing the comparison of the input and the thermometer code register, according to some aspects and embodiments of the invention. For this process as illustrated, it is assumed that the preferred sequence of ports has been identified, and the sequence of corresponding state values are stored in the register in thermometer code, with a current register value selected. At step 1000, an arbiter receives one or more messages from ports connected to it. At step 1100, the arbiter determines whether several messages have been received within the same clock cycle. If there is a single input message, the answer is NO and the process proceeds to step 1900, which selects the single input message, and proceeds to step 2000, which grants passage for the selected message through the output port. Once the message has been sent, the process proceeds to step 1600, where the stored state value is changed to represent the port in the sequence immediately following the port corresponding to the message just sent. In accordance with some aspects and embodiments of the invention, the transmission of a single message (with no conflict) would reset the round robin to the position after that message, regardless of what had come before.

If, however, there is more than one message in step 1100, the answer is YES, and the process then executes a comparison loop for each message to determine if it is arriving from the currently designated port. At step 1200, the first of the multiple messages is selected. At step 1300, the port information for the first message is converted to thermometer code. At step 1400, the input thermometer code is compared to a thermometer code representation for the current state value in the register using an exclusive OR (XOR) process.

At step 1500 the results of the comparison are determined. If the currently selected message matches the current port selection, then the answer is YES, and the process then sends the selected message at step 2000, which grants passage for the selected message and sends it through the output port. Once the message has been sent, the process proceeds to step 1600 and the stored register value is changed to represent the port immediately following the port for the message just sent, resetting the position of the register in the sequence of ports.

If, on the other hand, the first selected message does not correspond to the stored value, the answer is NO, and the process proceeds to step 1350, setting aside the first message and selecting the second message. The process then repeats steps 1300-1500 for the second selected message.

If there is again no match, the process repeats the loop of steps 1350-1500 for selecting and comparing the third message, and so on, until all messages have been compared.

In accordance with some aspects and embodiments, after the messages are compared, if none match the current register value, the message with a port number later in the sequence yet closest to the register value is selected to send through the output port. In accordance with some aspects, there is a buffer to store how far away each value is and the system choses the "closest" if there is no exact match.

For this process as illustrated in FIG. 6, in accordance with some aspects of the invention, the preferred sequence of ports has been identified and is predetermined, generally as a stored list and, for many embodiments of the invention disclosed here, in thermometer code. In accordance with some other aspects and embodiments of the invention, the system allows for the priority to be dynamic, being determined or changed over time in the course of various operations. For example, if numerous uncontested grants to a particular port may have occurred in a recent time window, the next port in the sequence may become a default setting for any reset, rather than simply allowing the frequently allowed port or ports to retain an equal placement in the round robin sequence. Likewise, a frequently allowed port may be skipped for certain sequences, giving priority under some circumstances to other ports. Those skilled in the art may realize other blends of priorities and sequences that may offer advantages for particular applications.

Figure 7:
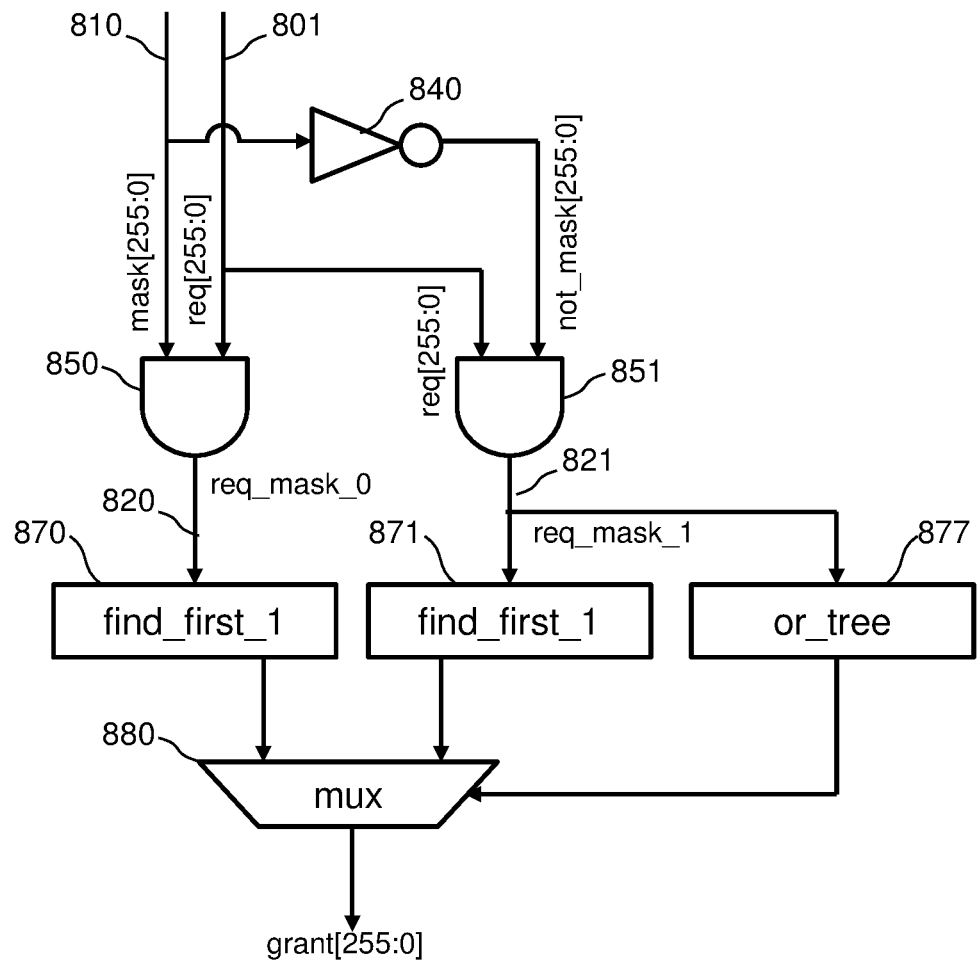
FIG. 7 presents a logical flow chart for the steps used in a round robin arbiter having 256 inputs in accordance with the various aspects and embodiments of the invention.

FIG. 7 illustrates a logic diagram for the XOR comparison steps as may be used in the process of FIG. 6, in this case with a current port number state value represented in thermometer code "mask[255:0]" 810 to be compared with an input message, also converted to thermometer code as "req[255:0]" 801. The illustration is provided for a 256-bit logic representation, for comparison with the previous example for a conventional round robin logic process.

In one branch of the computation, both of these input signals 810 and 801 are provided to a logical AND operator 850, and the resulting output is designated as "req_mask_0" 820.

Meanwhile, in parallel, the current port number state 810 is provided to an inverter 840, producing the complement of the current port number "not_mask[255:0]". This, along with the input message "req[255:0]" 801 is provided to a second logical AND operator 851, and the resulting output is designated as "req_mask_1" 821.

These results req_mask_0 820 and req_mask_1 821 are each provided to find_first_1 operators 870 and 871, respectively, to identify the placement of the first bit in the combined thermometer representations. However, req_mask_1 821 is additionally provided to an or tree operation 877, and the results of these 3 operations are provided to a multiplexor 880 to determine if the permission should be granted.

In some aspects and embodiments of the invention, the result req_mask_1 is given the higher priority for find_first_1, meaning that if req_mask_1 has a 1, then it determines the output grant. However, if there is no 1 in req_mask_1, the output grant is then determined by find_first_1 870.

The number of levels of logic needed for this process for an arbiter is given by:

$$\begin{aligned} \text{Levels of Logic} &= \text{input\_mask}(1) + \\ &\quad \text{thermo\_find\_first\_logic}(\log 2(n) + 1) + \\ &\quad \text{mux logic}(1) \\ &= 3 + \log 2(n) \\ &= 3 + \log 2(256) = 3 + 8 \\ &= 11 \end{aligned} \qquad \text{[Eqn. 2]}$$

By comparison with the number of steps in the previous round robin example of Eqn. 1 (which produced a value of 19), this value of 11 represents a reduction in the number of operations by ~42%. And, since the number of operations is reduced, the number of transistors and logic gates needed to represent this smaller number of operations requires less area on the integrated circuit.

Figure 8:
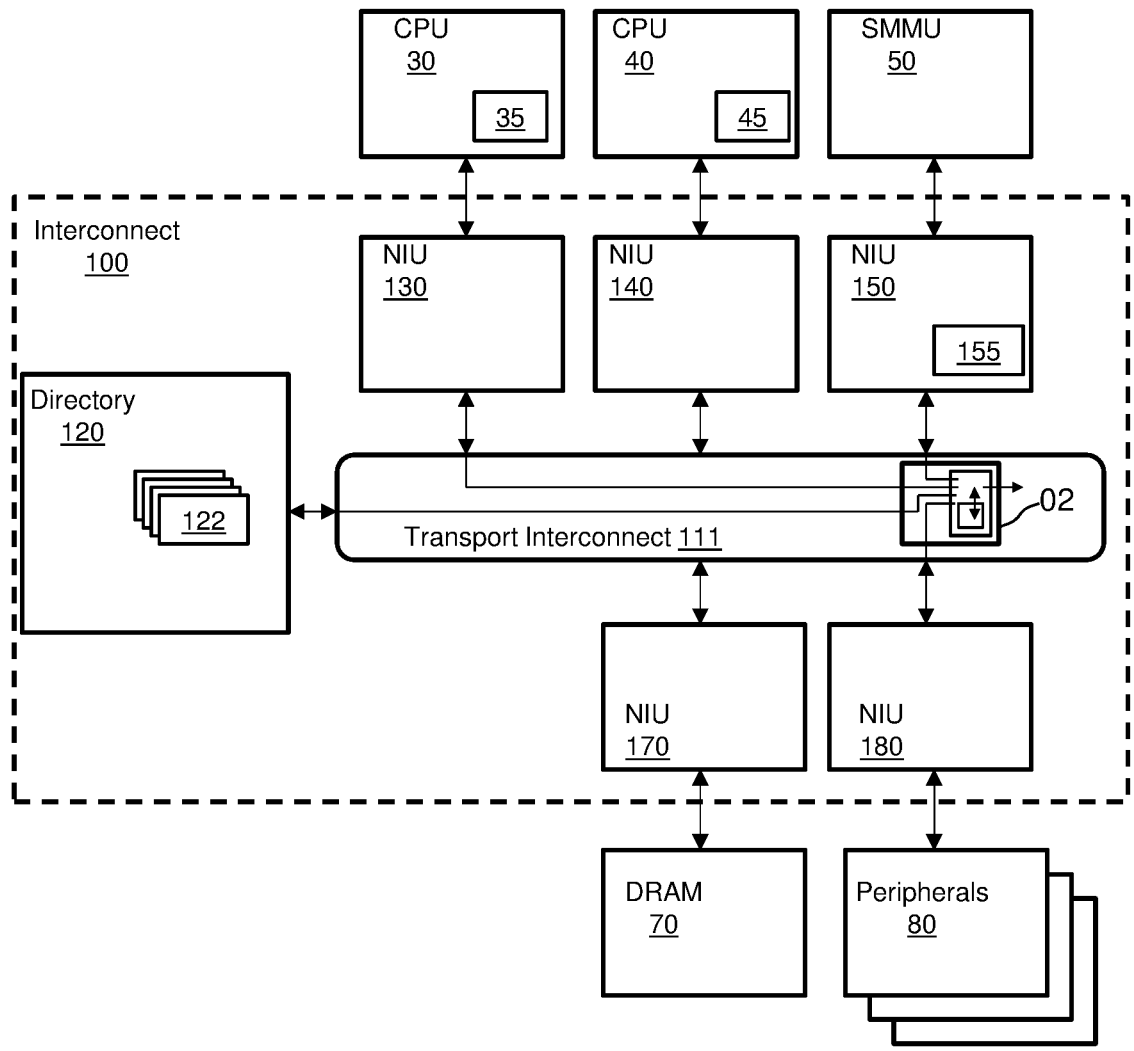
FIG. 8 presents a schematic of a cache coherent interconnect having a round robin arbiter in accordance with the various aspects and embodiments of the invention.

A round robin arbiter according to aspects and embodiments of the invention can be placed in many different elements within an interconnect or even in IP blocks connected to an interconnect. FIG. 8 illustrates an example having the Interconnect 100 of FIG. 1 now with a switch 02 placed in the transmission interconnect 111 that connects the various elements. It is shown as connected to 4 different elements as inputs, and with the output entering the general bus of the interconnect.

The placement of an arbiter according to the invention in a transport interconnect is not, however, the only location where such an arbiter may be placed. One or more arbiters according to embodiments of the invention may be inserted into the elements connected via the interconnect, such as the CPUs 30 and/or 40. One or more arbiters in some embodiments of the invention may be placed within the various NIUs, such as 130 or 140. One or more arbiters may be placed in multiple locations throughout the interconnect, in any location where an arbiter is needed to decide which one among many messages needs to be selected for forwarding.

Likewise, although these illustrations present examples of a round robin arbiter according to embodiments of the invention using a single arbiter, embodiments may exist in which multiple round robin arbiters are chained together, so that multiple arbitrations for multiple separate resources can be completed in a single clock cycle. For example, a snoop filter transaction table entry must arbitrate for buffer credits and snoop credits before arbitrating for the snoop request transmit port.

Although the above aspects and embodiments describe thermometer codes being calculated in response to the input, the state values within the register (e.g. the park points) may be pre-calculated and stored as thermometer codes.

Certain methods according to the various aspects of the invention may be performed by instructions that are stored upon a non-transitory computer readable medium, for example a module. The non-transitory computer readable medium stores code including instructions that, if executed by one or more processors, would cause a system or computer to perform steps of the method described herein, including methods performed by a module, such as the modules described herein. The non-transitory computer readable medium includes: a rotating magnetic disk, a rotating optical disk, a flash random access memory (RAM) chip, and other mechanically moving or solid-state storage media.

Any type of computer-readable medium is appropriate for storing code comprising instructions according to various example. Some examples are one or more non-transitory computer readable media arranged to store such instructions for methods described herein. Additionally, modules may be represented by codes stored in non-transitory media or represented by hardware components that performs a specific function. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations.

Descriptions herein reciting principles, aspects, and embodiments encompass both structural and functional equivalents thereof. Elements described herein as coupled have an effectual relationship realizable by a direct connection or indirectly with one or more other intervening elements.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, Wi-Fi, 3G, 4G long-term evolution (LTE), 5G, and other wireless interface standard radios. The IP block or element may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-field protocols, or RFID.

The scope of the invention, therefore, is not intended to be limited to the exemplary embodiments shown and described herein. Rather, the scope and spirit of present invention is embodied by the appended claims.

What is claimed is:

1. A method for selecting one of several messages from different intellectual property (IP) blocks for transmission to an output port, the method comprising:
   receiving messages, each from the different IP blocks, wherein each message arrives at one of a plurality of input ports;
   converting input port information for each of the received messages to a representation in thermometer code;
   comparing, using a multiplexing function, the thermometer code representation to a current state thermometer code representation for a current state value;
   determining if the thermometer code representation, of a selected message from the messages, is a match to the current state thermometer code representation based on the comparing; and
   transmitting, if there is a match, the selected message corresponding to the thermometer code that is a match to the output port.

2. The method of claim 1, wherein the current state value is selected from a predetermined sequence of values corresponding to the plurality of input ports.

3. The method of claim 2 further comprising incrementing the current state value to the next value in the sequence.

4. The method of claim 2, further comprising:
   determining, when there is not a match, if one of the multiple messages corresponds to a match with the next value in the predetermined sequence of values representing the plurality of input ports;
   transmitting, if there is a match, the message corresponding to the match to the output port; and
   incrementing the current state value to the next value in the sequence.

5. The method of claim 1, wherein the step of comparing comprises:
   a first AND operation comparing the representation and the current state thermometer code representation;
   a second AND operation comparing the representation and the inverse of the current state thermometer code representation;
   a find first_1 operation on each of the outputs of the first AND operation and the second AND operation;
   an OR tree operation on the results of the second AND operation; and
   a multiplexing operation on the results of the find first_1 operation and the OR tree operation.

6. A switch comprising:
   an arbiter, wherein the arbiter:
   receives messages, each from different IP blocks, wherein each message arrives at one of a plurality of input ports;
   converts input port information for each of the received messages to a representation in thermometer code;

compares, using a multiplexing function, the thermometer code representation to a current state thermometer code representation for a current state value;

determines if the thermometer code representation, of a selected message from the messages, is a match to the current state thermometer code representation based on the comparing; and transmits, if there is a match, the selected message corresponding to the thermometer code that is a match to an output.

7. The switch of claim 6, wherein the current state value is selected from a predetermined sequence of values corresponding to the plurality of input ports.

8. A network-on-chip (NoC) comprising:

an arbiter, wherein the arbiter:

receives messages, each from a different IP blocks, wherein each message arrives at one of a plurality of input ports;

converts input port information for each of the received messages to a representation in thermometer code;

compares, using a multiplexing function, the thermometer code representation to a current state thermometer code representation for a current state value;

determines if the thermometer code representation, of a selected message from the messages, is a match to the current state thermometer code representation based on the comparing; and transmits, if there is a match, the selected message corresponding to the thermometer code that is a match to an output.

9. The NoC of claim 8, wherein the current state value is selected from a predetermined sequence of values corresponding to each of different input ports.

* * * * *